United States Patent [19]
Hishida

[11] Patent Number: 4,996,613
[45] Date of Patent: Feb. 26, 1991

[54] SPINDLE MOTOR WITH NON-CONTACT SEAL

[75] Inventor: Noriaki Hishida, Kyoto, Japan

[73] Assignee: Nippon Densan Corporation, Kyoto, Japan

[21] Appl. No.: 271,434

[22] Filed: Nov. 15, 1988

[30] Foreign Application Priority Data

Nov. 25, 1987 [JP] Japan .............. 62-179170[U]

[51] Int. Cl.$^5$ .............................................. G11B 17/02
[52] U.S. Cl. .............................. 360/99.08; 360/98.07; 310/90
[58] Field of Search ............... 360/99.08, 99.04, 98.07, 360/98.01–98.02, 133; 310/90

[56] References Cited

U.S. PATENT DOCUMENTS

| | | | |
|---|---|---|---|
| 1,843,628 | 2/1932 | Poesse . | |
| 2,479,349 | 8/1949 | Hagg | 308/240 |
| 2,633,393 | 3/1953 | Bradley | 308/132 |
| 3,004,782 | 10/1961 | Meermans | 286/5 |
| 3,702,704 | 11/1972 | Bloch | 277/134 |
| 3,975,026 | 8/1976 | Boyle | 277/4 |
| 4,209,722 | 6/1980 | Peachee | 310/90 |
| 4,519,010 | 5/1985 | Elsaesser | 360/99.08 |
| 4,535,373 | 8/1985 | Schuh | 360/99.08 X |

FOREIGN PATENT DOCUMENTS

| | | |
|---|---|---|
| 2146695 | 3/1972 | Fed. Rep. of Germany . |
| 3144629 | 7/1982 | Fed. Rep. of Germany . |
| 3303499 | 8/1983 | Fed. Rep. of Germany . |
| 8711050 | 12/1987 | Fed. Rep. of Germany . |
| 3731141 | 3/1988 | Fed. Rep. of Germany . |
| 59-22273 | 2/1984 | Japan .................. 360/98.07 |
| 60-5490 | 1/1985 | Japan .................. 360/98.01 |

OTHER PUBLICATIONS

G. Niemann—Maschinen-elemente, (1981), pp. 339–343.

Primary Examiner—John H. Wolff
Attorney, Agent, or Firm—William H. Eilberg

[57] ABSTRACT

A spindle motor used for example to drive magnetic discs comprises a central shaft and a cylindrical member rotatable relative to the central shaft through a pair of bearings. A small annular clearance is formed between the central shaft and the cylindrical member to communicate with an interior space adjoining one of the bearings. A helical groove is provided at the annular clearance and serves to force any fluid, such as grease vapor, into the interior space.

10 Claims, 3 Drawing Sheets

SPINDLE MOTOR WITH NON-CONTACT SEAL

BACKGROUND OF THE INVENTION

1. Field of the Invention

This invention relates generally to spindle motors, and more particularly to a spindle motor which is suitable for driving data carriers such as magnetic discs.

2. Description of the Prior Art

As is well known, spindle motors are often used to drive magnetic data storage discs to write in or read out data by the aid of a magnetic read-write head. However, a problem with such a spindle motor is that it permits outflow, from the interior bearing system, of contaminant fluids, such as fluidized grease particles, which may adversely influence the magnetic disc being driven.

U.S. Pat. No. 4,519,010 to Elsaesser et al discloses a spindle motor which comprises a hub mounted to a rotary shaft for supporting one or more magnetic discs, and a stator for electromagnetically rotating the hub. The rotary shaft is rotatably supported in a stationary bushing by means of a bearing system. One end of the bushing is provided with a permanent magnet ring interposed between a pair of annular pole pieces (FIG. 4 of Elsaesser et al). The pole pieces are smaller in inner diameter than the magnet ring and extends radially inwardly into contact with a sleeve, so that an annular cavity is defined by the permanent magnet ring, the pole pieces and the sleeve. The annular cavity is filled with a ferromagnetic fluid to form a magnetic fluid seal against outflow, from the bearing system, of contaminant particles such as grease particles.

The magnetic fluid seal of Elsaesser et al works satisfactorily to prevent contaminant leakage. However, a difficulty arises in filling a predetermined small amount of the magnetic fluid into the annular cavity. Further, the magnetic fluid seal results in complicated structure and high production cost.

SUMMARY OF THE INVENTION

It is, therefore, an object of the invention to provide a spindle motor which is capable of effectively preventing contaminant leakage with a very simple arrangement.

According to the present invention, there is provided a spindle motor comprising: stationary means including a stator for generating a rotating magnetic field; rotary means rotatably supported on the stationary means by bearing means and electromagnetically rotated by the rotating magnetic field, the rotary means including a hub for supporting at least one article to be rotated therewith; a small annular clearance located outwardly of the bearing means and formed between the stationary means and the rotary means to communicate with an interior space adjoining the bearing means; and helical groove means provided at the annular clearance to force any fluid into the interior space when the rotary means is rotated relative to the stationary means.

According to the arrangement described above, the only additional requirement is the formation of the helical groove means at the annular clearance between the stationary means and the rotary means. The helical groove means serves to counteract outflow of any fluid, such as fluidized contaminant particles, from the interior space when the rotary means is rotated relative to the stationary means. Thus, it is possible to provide a very simple but effective seal against unwanted outflow of contaminant fluids, thereby preventing the article (e.g. magnetic disc) driven on the hub from being contaminated.

According to a preferred embodiment of the invention, the stationary means further includes a fixed central shaft, and the rotary means is rotatably supported on the central shaft by the bearing means provided by a pair of bearings. The annular clearance is located axially outwardly of one bearing, and defined between a first cylindrical surface provided by the rotary means and a second cylindrical surface provided by the central shaft at a position opposed to the first cylindrical surface.

The helical groove means may be formed on either or both of the first and second cylindrical surfaces.

According to another preferred embodiment of the invention, the rotary means further includes a central shaft mounted to the hub for rotation therewith, and the stationary means further includes a cylindrical mount portion in which the rotary shaft is rotatably supported by the bearing means provided by a pair of bearings. The annular clearance is formed between the rotary shaft and the mount portion at a position axially outwardly of one bearing.

Other objects, features and advantages of the invention will be fully understood from the following description of the preferred embodiments given with reference to the accompanying drawings.

DESCRIPTION OF THE PREFERRED EMBODIMENTS

Figure 1:
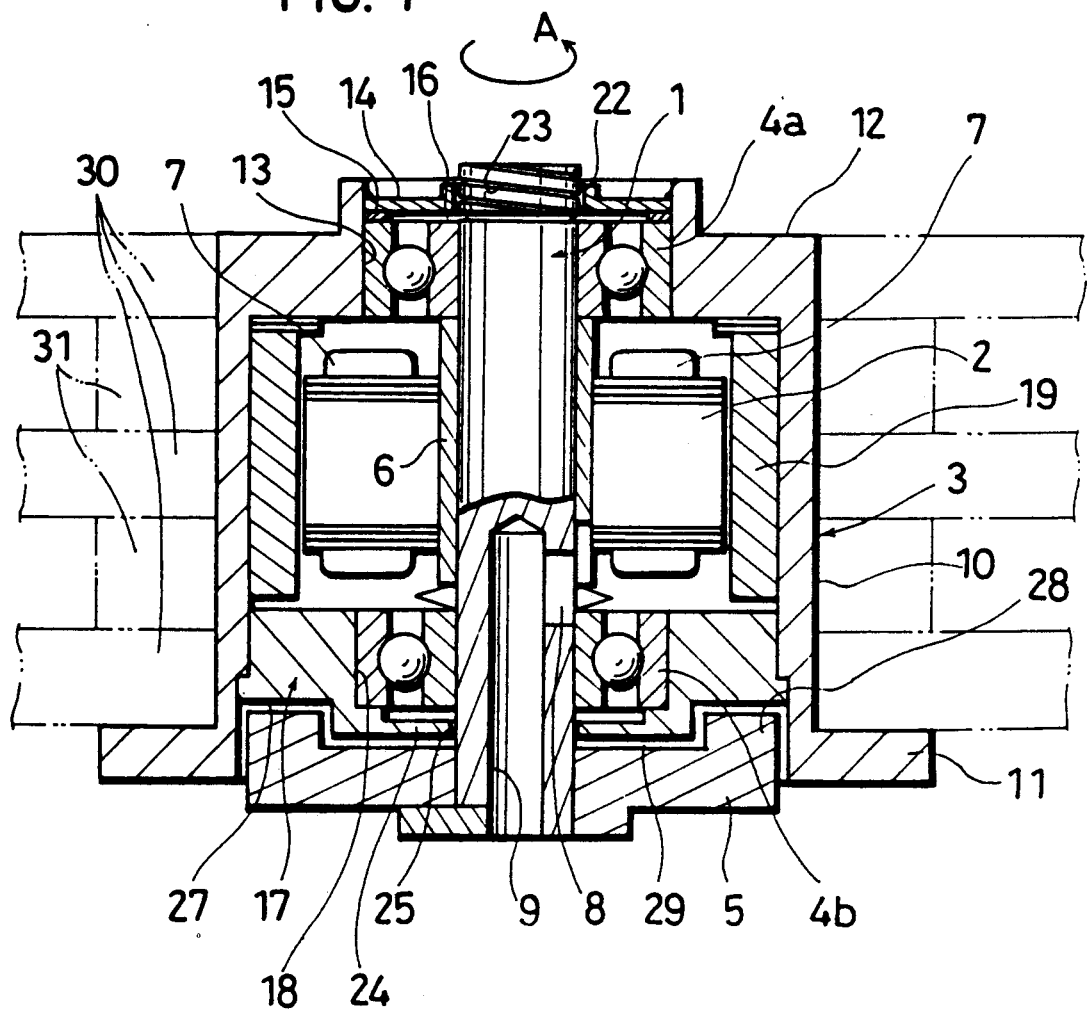
FIG. 1 is a view, in vertical section, showing a spindle motor embodying the invention.

Referring to FIG. 1 of the accompanying drawings, there is illustrated a spindle motor which mainly comprises a fixed central shaft 1, a stator 2 mounted on the central shaft, and a rotor or hub 3 rotatably supported on the central shaft by means of first and second bearings 4a, 4b spaced axially from each other with the stator arranged therebetween. The central shaft 1 is fixed to a mount bracket 5 which in turn is fixed to a stationary part (not shown) of the device or apparatus incorporating the motor.

The stator 2 is mounted on the central shaft 1 via an intervening cylindrical member 6 and has a plurality of windings 7 which, when energized successively, generate a rotating magnetic field. The central shaft 1 is formed with a lateral opening 8 and an axial bore 9 in communication therewith, so that the leads (not shown) of the windings 7 are led out through the lateral opening 8 and the axial bore 9 for connection to an external power source or drive circuit (not shown). Obviously, the central shaft 1, the stator 2 and the mount bracket 5 constitute stationary parts of the motor.

The hub 3 has a cylindrical wall 10, an annular end flange 11 at one end of the cylindrical wall close to the mount bracket 5, and a cover wall 12 at the other end of the cylindrical wall. The cover wall 12 is formed with a central bore 13 to receive the first bearing 4a. The central bore 13 is substantially closed by a closure ring 14 which is slightly spaced from the first bearing 4a by an annular spacer 15 to define an annular interior space 16 adjoining the first bearing.

Into the flanged opening end of the rotor 3 is fitted an annular retainer ring 17 having a central recess 18 to receive the second bearing 4b. The cylindrical wall 10 is internally provided with a plurality of permanent magnets 19. Thus, the hub 3 is rotated relative to the fixed central shaft 1 by the rotating magnetic field produced by the stator 2. Apparently, the hub 3, the closure ring 14, the retainer ring 17, and the magnets 19 constitute rotary parts of the motor.

Figure 2:
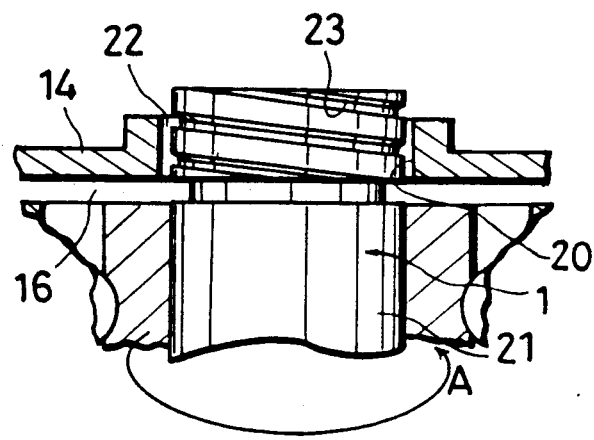
FIG. 2 is an enlarged fragmentary view, in vertical section, showing a portion of the spindle motor illustrated in FIG. 1.

To ensure smooth rotation of the hub 3, the closure ring 14 has an inner cylindrical surface 20 which is slightly spaced from the outer cylindrical surface 21 of the central shaft 1 to provide a small annular clearance 22 therebetween, as better illustrated in FIG. 2. A portion of the shaft outer surface 21 positioned at the clearance 22 is formed with a helical groove 23. The function of this helical groove will be described hereinafter.

The retainer ring 17 has an annular projection 24 extending inwardly to define another small annular clearance 25 between the annular projection 24 and the outer cylindrical surface 21 of the central shaft 1, thereby ensuring smooth rotation of the hub 3. The retainer ring 17 further defines an annular recess 27 in cooperation with the flanged opening end of the hub 3, and the mount bracket 5 has a riser portion 28 extending into the annular recess 27. In this way, a labyrinth clearance 29 is formed between the retainer ring 17 and the mount bracket 5. The function of this labyrinth clearance will be described hereinafter.

In operation, one or more magnetic discs 30 (three in FIG. 1) each having a central opening are fitted on the cylindrical wall 10 of the hub 3 as spaced apart by means of mount spacers 31. In this condition, the hub 3 together with the closure ring 14 is rotated relative to the fixed central shaft 1 by the rotating magnetic field generated by the stator 2, as indicated by an arrow A in FIGS. 1 and 2. Any fluid existing in the annular clearance 22 is also rotated with the closure ring, while the central shaft 1 together with the helical groove 23 formed thereon remains stationary. As a result, the fluid moves along the groove 23 inwardly into the interior space 16 adjoining the first bearing 4a. This means that contaminant fluids such as grease particles and/or vapor from the first bearing 4a are effectively prevented from flowing out through the annular clearance 22, consequently ensuring contamination-free driving of the magnetic discs 30.

At the flanged opening end of the hub 3, on the other hand, any fluid within the annular clearance 25 must go through the labyrinth clearance 29 before flowing out of the motor. However, since the labyrinth clearance 29 includes bends to provide a complicated path, it is difficult for the fluid to reach the outlet end of the labyrinth. Therefore, contaminant outflow is also effectively prevented at the opening end of the hub.

According to the present invention, the helical groove 23 must be formed in such a manner or direction that it forces the fluid within the annular clearance 22 to flow into the interior space 16 when the hub 3 is rotated in the arrow A direction. The groove 23 may be V-shaped in cross section, as apparent from FIG. 2. Of course, the groove 23 may have a different cross-sectional shape such as rectangular or trapezoidal. Further, the inner cylindrical surface of the closure ring 14 may be formed with a helical groove (not shown) in addition to or in place of the helical groove 23 on the central shaft 1.

Figure 3:
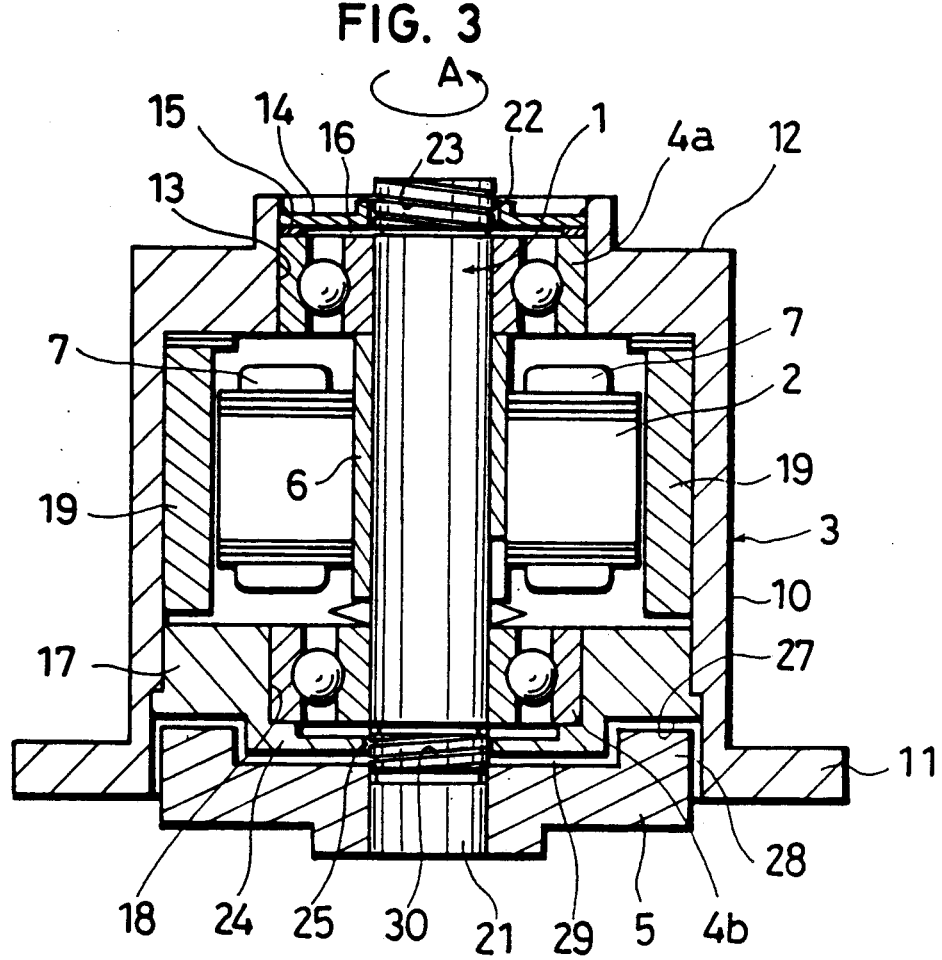
FIG. 3 is a view similar to FIG. 1 but showing a slight modification of the spindle motor illustrated in FIG. 1.

FIG. 3 shows a slightly modified spindle motor which differs from the embodiment of FIG. 1 only in that the cylindrical outer surface 21 of the fixed central shaft 1 is formed with another helical groove 30 at a position opposed to the inner cylindrical surface of the annular projection 24. Combined with the labyrinth clearance 29 previously described, this helical groove 30 serves to more reliably prevent contaminant effusion at the flanged opening end of the hub 3.

Apparently in the modification illustrated in FIG. 3, the inner cylindrical surface of the annular projection 24 may also be formed with a helical groove in addition to or in place of the helical groove 30 on the central shaft 1.

Figure 4:
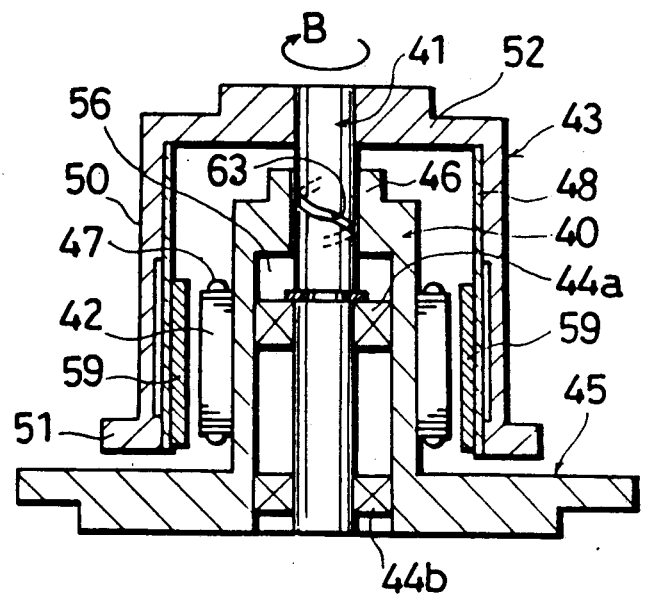
FIG. 4 is a view, in vertical section, showing another spindle motor embodying the invention.
Figure 5:
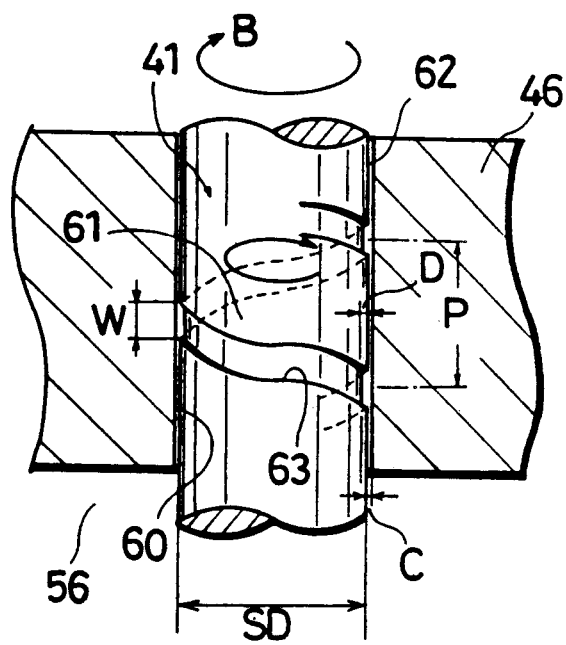
FIG. 5 is an enlarged fragmentary view, in vertical section, showing a principal portion of the spindle motor illustrated in FIG. 4.

FIGS. 4 and 5 show another spindle motor which comprises a cylindrical stator mount 40 integrally formed at one end thereof with an annular mount bracket 45. The cylindrical mount 40 is further provided at the other end thereof with a bored cover wall 46 penetrated by a central rotary shaft 41. The rotary shaft is rotatably supported by first and second bearings 44a, 44b fitted in the cylindrical mount 40 as axially spaced apart from each other. The cylindrical mount 40 externally carries a stator 42 which has a plurality of windings 47 for generating a rotating magnetic field upon successive energization thereof.

A hub or rotor 43, which has a shape of an inverted cup, is mounted to the projecting end of the rotary shaft 41. The rotor has a cylindrical wall 50 surrounding the cylindrical stator mount 40, an annular end flange 51 at one end of the cylindrical wall close to the mount bracket 45, and a cover wall 52 at the other end of the cylindrical wall 50 for tightly receiving the projecting end of the rotary shaft 41. The cylindrical wall 50 is internally provided with a plurality of permanent magnets 59 via an magnetic shield member 48. Thus, the rotor 43 can be rotated smoothly in the direction of an arrow B by the rotating magnetic field generated by the stator 42. The rotational position of the rotor is detected by a position sensor (not shown) disposed on the mount bracket 45 to control the coil energization of the stator 42.

The bored cover wall 46 of the stator mount 40 has an inner cylindrical surface 60 which is slightly spaced from the outer cylindrical surface 61 of the rotary shaft 41 to define a small annular clearance 62, as illustrated in FIG. 5. This annular clearance communicates with an annular interior space 56 adjoining the first bearing 44a (FIG. 4). The outer cylindrical surface 61 of the rotary shaft 41 is formed with a helical groove 63.

According to this embodiment, the rotary shaft 41, the rotor 43, the magnetic shield member 48 and the permanent magnets constitute rotary parts of the motor, whereas the stator mount 40, the mount bracket 45 and the stator constitute stationary parts of the motor.

In operation, the rotor 43 together with the rotary shaft 41 rotates in the arrow B direction, which causes the fluid within the annular clearance 62 to rotate in the same direction but with a considerable delay. Therefore, the fluid is also caused to move along the helical groove 63 axially inwardly into the annular interior space 56, consequently preventing contaminant outflow from the first bearing 44a. On the other hand, the space below the mount bracket 45 (i.e., second bearing 44b) is closed by a partition plate (not shown) to which the mount bracket 45 is fixed. Therefore, no special measure for prevention of contaminant outflow is required with respect to the second bearing 44b.

With the parameters listed below for the embodiment illustrated in FIGS. 4 and 5, the contaminant outflow can be reduced to 1/50–1/10 of that provided by a conventional spindle motor without a fluid seal.

Clearance size C: 100 μm or less
Groove depth D: 10 μm–50 μm
Groove width W: 1 mm–3 mm
Groove pitch P: 1.5 mm
Shaft diameter SD: 6 mm (approx.)
Rotor revolution: 3,000 rpm The various parameters of the helical groove may be altered depending on particular requirements for the spindle motor. Preferably, the groove depth D is 0.1 mm or less.

Figure 6:
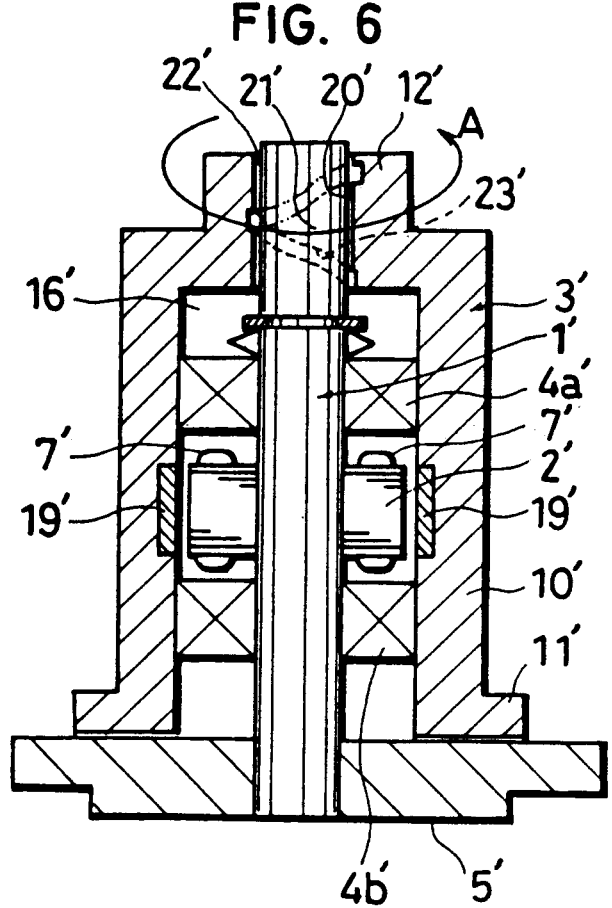
FIG. 6 is a view, in vertical section, showing a further spindle motor embodying the invention.

Still another spindle motor illustrated in FIG. 6 comprises a fixed central shaft 1' supported on a mount bracket 5' and carrying a stator 2' with a plurality of windings 7'. A rotor or hub 3', which has a shape of an inverted cup, is rotatably supported on the central shaft 1' by means of first and second bearings 4a', 4b'.

The rotor has a cylindrical wall 10' internally provided with a plurality of permanent magnets 19', an annular end flange 11' at one end of the cylindrical wall, and a bored cover wall 12' at the other end of the cylindrical wall. The cover wall of the rotor has a inner cylindrical surface 20' which is slightly spaced from the outer cylindrical surface 21' of the central shaft 1' to define an annular clearance 22' communicating with an annular interior space 16' adjoining the first bearing 4a'.

According to the embodiment of FIG. 6, the inner cylindrical surface 20' of the rotor cover wall 12' is formed with a helical groove 23' for forcing the fluid into the interior space 16' when the rotor 3' is rotated in the arrow A direction, thereby preventing contaminant outflow.

Obviously, a portion of the shaft outer surface 21' opposed to the inner cylindrical surface 20' may be formed with another helical groove (not shown) in addition to or in place of the helical groove 23' on the inner cylindrical surface 20'.

The invention being thus described, it is obvious that the same may be varied in many ways. For instance, there may be provided a hub for supporting an article or articles to be driven, and a separate rotor cooperative with a stator for driving the hub, as shown in FIGS. 2, 4 and 5 of U.S. Pat. No. 4,519,010. Further, the spindle motor according to the invention may be used to drive not only magnetic discs but also other articles such as optical discs. Such variations are not to be regarded as a departure from the spirit and scope of the invention, and all such modifications as would be obvious to those skilled in the art are intended to be included within the scope of the following claims.

I claim:

1. A spindle motor comprising:
   stationary means including a stator for generating a rotating magnetic field;
   rotary means rotatably supported on said stationary means by a pair of axially spaced bearings and electromagnetically rotated by said rotating magnetic field, said rotary means including a hub for supporting at least one article to be rotated therein:
   a small annular clearance associated with at least one of said bearings, said clearance being located on the side of said one bearing axially away from the other bearing to communicate with the exterior of the spindle motor, said clearance being formed between a pair of opposed cylindrical surfaces of said stationary means and said rotary means; and
   at least one helical groove formed at said annular clearance on at least one of said cylindrical surfaces for forming an air flow along said helical groove toward said one bearing when said rotary means is rotated in a predetermined rotational direction relative to said stationary means.

2. The spindle motor as defined in claim 1, wherin said stationary means further includes a fixed central shaft, said rotary means being rotatably supported on said central shaft by said pair of bearings, said annular clearance being formed directly around said central shaft.

3. The spindle motor as defined in claim 2, wherein said central shaft has an outer cylindrical surface, said helical groove being formed on said outer cylindrical surface of said central shaft at said annular clearance.

4. The spindle motor as defined in claim 2, wherein said rotary means further includes a closure ring fitted in said hub on the side of said one bearing axially away from said other bearing, said closure ring having an inner cylindrical surface which defines said annular clearance around said central shaft.

5. The spindle motor as defined in claim 2, wherein said hub has an inner cylindrical surface defining said annular clearance around said central shaft, said helical groove being formed on said inner cylindrical surface of said hub.

6. The spindle motor as defined in claim 2, wherein said rotary means further includes a retainer ring fitted in said hub for retaining said other bearing, said retainer ring having an annular projection located on the side of said other bearing axially away from said one bearing, said annular projection extending toward said central shaft to define another annular clearance around said central shaft; and said stationary means further includes a mount bracket fixed to said central shaft, said mount bracket having a riser portion, a labyrinth clearance being formed between said other annular clearance and said mount bracket in communication with said other annular clearance.

7. The spindle motor as defined in claim 6, further comprising another helical groove formed at said other annular clearance for forming another air flow along said other helical groove toward said other bearing when said rotary means is rotated in said predetermined rotational direction relative to said stationary means.

8. The spindle motor as defined in claim 7, wherein said other helical groove is formed on said central shaft at said other annular groove.

9. The spindle motor as defined in claim 1, wherein said rotary means further includes a central rotary shaft mounted to said hub for rotation therewith; and said stationary means further includes a cylindrical mount portion in which said rotary shaft is rotatably supported by said pair of bearings, said annular clearance being formed between said rotary shaft and said cylindrical mount portion.

10. The spindle motor as defined in claim 9, wherein said helical groove is formed on said rotary shaft at said annular clearance.

* * * * *